(12) United States Patent
Bisbis

(10) Patent No.: US 6,524,847 B2
(45) Date of Patent: Feb. 25, 2003

(54) COMPOSTING SYSTEM

(75) Inventor: Benyoussef Bisbis, Echternach (LU)

(73) Assignee: E. I. du Pont de Nemours and Company, Wilmington, DE (US)

( * ) Notice: Subject to any disclaimer, the term of this patent is extended or adjusted under 35 U.S.C. 154(b) by 41 days.

(21) Appl. No.: 09/681,889

(22) Filed: Jun. 21, 2001

(65) Prior Publication Data

US 2002/0019045 A1 Feb. 14, 2002

Related U.S. Application Data

(60) Provisional application No. 60/213,960, filed on Jun. 23, 2000.

(51) Int. Cl.⁷ .................................................. C05F 9/02
(52) U.S. Cl. .................................. 435/290.1; 435/297.1
(58) Field of Search ................ 435/290.1, 297.1, 435/292.1; 47/17; 71/8–10

(56) References Cited

U.S. PATENT DOCUMENTS

| | | | | |
|---|---|---|---|---|
| 4,397,122 A | * | 8/1983 | Cros | 47/17 |
| 4,798,023 A | * | 1/1989 | Morssinkhof | 47/17 |
| 4,823,517 A | * | 4/1989 | Dickinson | 135/119 |
| 4,929,303 A | | 5/1990 | Sheth | |
| 5,201,192 A | | 4/1993 | Hara | |
| 5,206,173 A | * | 4/1993 | Finn | 435/290.1 |
| 5,656,167 A | | 8/1997 | Martz | |
| 6,071,834 A | | 6/2000 | Martz | |

FOREIGN PATENT DOCUMENTS

| | | | |
|---|---|---|---|
| DE | 92 14 354 U | 1/1993 | |
| DE | 4220443 A1 * | 1/1994 | ............. E04B/9/00 |
| DE | 42 31 414 A1 | 3/1994 | |
| DE | 295 00 726.5 U1 | 4/1995 | |
| DE | 296 16 788 U1 | 4/1997 | |
| DE | 19630239 A1 * | 1/1998 | ............. C05F/9/02 |
| DE | 29911388 U1 * | 9/1999 | ............. C05F/9/02 |
| EP | 0 233 673 A | 8/1987 | |
| FR | 2 485 330 A | 12/1981 | |
| FR | 2 786 799 A | 6/2000 | |
| JP | 06345574 A * | 12/1994 | ........... C05F/03/06 |
| WO | WO 94 29241 A | 12/1994 | |
| WO | WO99/07548 A1 | 2/1999 | |
| WO | WO99/40271 A1 | 8/1999 | |
| WO | WO99 48969 A | 9/1999 | |

\* cited by examiner

*Primary Examiner*—William H. Beisner

(57) ABSTRACT

A composting system is provided that includes an enclosure for containing organic matter undergoing composting. The enclosure has an access through which organic waste can be introduced into the enclosure and through which composted matter can be removed from the enclosure. The enclosure has a sloped roof comprised of a composite laminate which includes an air and moisture permeable membrane having an inside surface that faces into said enclosure. The inside surface of the membrane is adhered to an open grid layer. The composting system may further include a device for introducing fresh air into organic matter being composted within the enclosure.

14 Claims, 3 Drawing Sheets

COMPOSTING SYSTEM

The application claims benefit of U.S. Provisional Application No. 60/213,960, filed Jun. 23, 2000.

BACKGROUND OF INVENTION

This invention relates to the use of a composite laminate as a membrane in composting systems. More particularly, the invention relates to a composting system having a membrane that is waterproof, air and moisture vapor permeable, and includes a grid layer for controlling the return of condensate to a compost pile. Treatment of solid fermentable organic wastes such as municipal sludge, household organic waste, agricultural waste, and other organic wastes including hydrocarbon-contaminated soils, has been achieved using various composting methods. For example, the waste materials can be spread in windrows or boxes where they ferment and produce soil or growth substrate improvement products. When the fermentation is conducted in the presence of air (aerobic fermentation) oxygen is consumed and the fermentation process produces carbon dioxide, water, and heat, resulting in an increase in temperature of the composted material. In traditional composting, the supply of oxygen is replenished by turning the windrows from time to time. The composting cycle time (time it takes for the organic matter to be degraded by microorganisms) is relatively long using this method, typically about six months or more. In addition, the compost pile takes up a considerable amount of land space.

Various methods have been used to accelerate the composting process. For example, forced aeration by blowing or sucking air into the compost windrow has been used to accelerate the composting process. Microbial activity is monitored by measuring the temperature and/or oxygen saturation at different points in the windrow. While controlled aeration has resulted in a significant reduction in composting cycle time, air channeling through the compost can be a problem, resulting in anaerobic areas throughout the windrow and unacceptably non-homogenous soil or compost. In addition, the exhaust from a forced aeration process carries with it odorous substances as well as bacteria and microorganisms which can be potentially harmful to humans and can create an unacceptable environmental nuisance to the neighboring communities.

In order to overcome these problems, breathable membranes have been introduced to cover the compost windrows or boxes in forced air systems. These membranes allow sufficient air and water vapor to pass through them, thus insuring the supply of oxygen to the microorganisms and the removal of excess heat and water vapor from the compost. In addition, the membranes are impermeable to rainwater, thus preventing the compost pile from becoming too wet. When the compost is protected from rainwater, the channeling problems discussed above are greatly reduced and oxygen mass transfer within the pores and micropores of the compost pile is enhanced. In addition, the membranes can be useful for reducing the escape of odorous molecules, bacteria, and fungi. Examples of membranes that have been used in composting systems include a microporous polyurethane sandwiched between two woven or non-woven materials, as described in German patent DE 4231414 to Ploucquet GmbH and a material supplied by W. L. Gore and Associates which has an expanded porous polytetrafluoroethylene layer sandwiched between two woven polyester materials.

Fixed composting systems in which the composting process is carried out in fixed enclosures are also known. Such systems generally comprise an enclosure having three side walls, a door for adding or removing organic waste or compost to and from the structure, and a slanted roof. The roof may be openable, such as those provided by BIODEGMA GmbH of Stuttgart, Germany, so as to permit a front-end-loader to deliver waste material or remove fresh compost. Air is supplied through the floor into the base of the compost pile. Membranes such as those described above can be installed in the roof of fixed composting enclosures. In these systems, a portion of the water vapor which is generated during the composting process condenses on the inside surface of the membrane to form water droplets which are returned to the compost layer below when they detach from the membrane surface. When conventional membranes are used, a significant percentage of the water droplets will travel downwardly along the surface of the membrane without detaching until the droplets impact upon one of the side walls of the enclosure. The water then runs down the side wall and is concentrated at the edges of the compost pile, resulting in a non-uniform moisture distribution in the compost and causing wet and dry areas which are undesirable for the reasons mentioned above.

SUMMARY OF INVENTION

There is provided by the present invention a composting system comprising an enclosure for containing organic matter undergoing composting. The enclosure has an access through which organic waste can be introduced into the enclosure and through which composted matter can be removed from the enclosure. The enclosure has a sloped roof comprised of a composite laminate which includes an air and moisture permeable membrane having an inside surface that faces into said enclosure. The inside surface of the membrane is adhered to an open grid layer. The composting system may further comprise means for introducing fresh air into organic matter being composted within the enclosure.

BRIEF DESCRIPTION OF DRAWINGS

A more thorough explanation of the invention will be provided in the detailed description of the preferred embodiments of the invention in which reference will be made to the following drawings.

DETAILED DESCRIPTION

Figure 1:
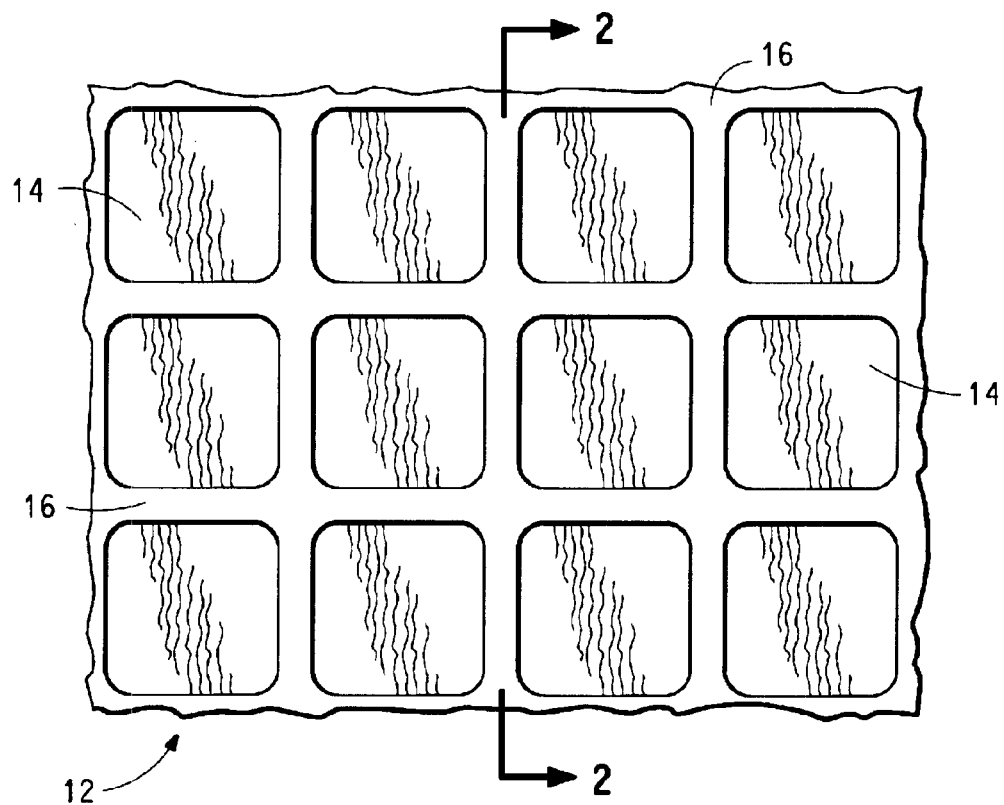
FIG. 1 is a plan view of a section of the composite laminate accordinging to one preferred embodiment of the invention.

In the description and in the non-limiting example that follows, the following test methods were employed to determine various reported characteristics and properties. ASTM refers to the American Society for Testing and Materials, and ISO refers to the International Organization for Standardization.

Tensile strength was measured according to ASTM D-4595-86 and is reported herein in units of N/5 cm.

Vapor permeability was measured at 23° C. according to ASTM E398-83 and is reported in units of g/m² day.

Air permeability was measured at 10 millibars according to ISO 9237-1995 and is reported in units of liters/m² sec.

Hydrostatic head was measured according to ISO 811 and is reported in units of centimeters of $H_2O$. The hydrostatic head is measured on the membrane prior to attachment of the grid layer. The hydrostatic head is measured on a circular membrane sample with water pressure applied to the side of the membrane opposite the side to which the grid layer is to be attached, which is to the side of the membrane that will be exposed to the outside environment. In the case of membranes where one or both of the sides are not smooth (such as a woven fabric), a sealant is applied to the portion of the non-smooth sides of the membrane sample that contact the circular rubber gaskets of the instrument during the hydrostatic head measurement. This is achieved by flattening a line of elastomeric glue on a circular piece of sample on the portion of the sample that will contact the rubber gaskets, and spreading the glue so that it will fill in any three dimensional features on the membrane surface and form a tight, leak-free seal with the rubber gaskets.

The term "polymer" as used herein, generally includes homopolymers, copolymers (such as for example, block, graft, random and alternating copolymers), terpolymers, and blends and modifications thereof. Furthermore, unless otherwise specifically limited, the term "polymer" shall include all possible geometrical configurations of the material. These configurations include isotactic, syndiotactic and random symmetries.

The term "polyolefin" as used herein, is intended to mean any of a series of largely saturated open chain polymeric hydrocarbons composed only of carbon and hydrogen atoms. Typical polyolefins include polyethylene, polypropylene, polymethylpentene and various combinations of the ethylene, propylene, and methylpentene monomers.

The term "polyethylene" as used herein is intended to encompass not only homopolymers of ethylene, but also copolymers wherein at least 85% of the recurring units are ethylene units.

The term "polypropylene" as used herein is intended to embrace not only homopolymers of propylene but also copolymers wherein at least 85% of the recurring units are propylene units.

The term "plexifilamentary" means a three-dimensional integral network of a multitude of thin, ribbon-like, film-fibril elements of random length and with a mean film thickness of less than about 4 microns and with a median fibril width of less than about 25 microns. In plexifilamentary structures, the film-fibril elements are generally coextensively aligned with the longitudinal axis of the structure and they intermittently unite and separate at irregular intervals in various places throughout the length, width and thickness of the structure to form a continuous three-dimensional network.

The term "meltblown fibers" as used herein, means fibers formed by extruding a molten thermoplastic polymer through a plurality of fine, usually circular, capillaries as molten threads or filaments into a high velocity gas (e.g. air) stream. The high velocity gas stream attenuates the filaments of molten thermoplastic polymer material to reduce their diameter to between about 0.5 and 10 microns. Meltblown fibers are generally discontinuous fibers. Meltblown fibers carried by the high velocity gas stream are normally deposited on a collecting surface to form a web of randomly dispersed fibers.

The term "spunbond" as used herein means a bonded sheet of meltspun fibers which are formed by extruding molten thermoplastic polymer material as filaments from a plurality of fine, usually circular, capillaries of a spinnerette. Meltspun fibers are generally continuous and have an average diameter of greater than about 5 microns.

The term "nonwoven fabric, sheet or web" as used herein means a structure of individual fibers or threads that are positioned in a random manner to form a planar material without an identifiable pattern, as in a knitted fabric.

Figure 2:
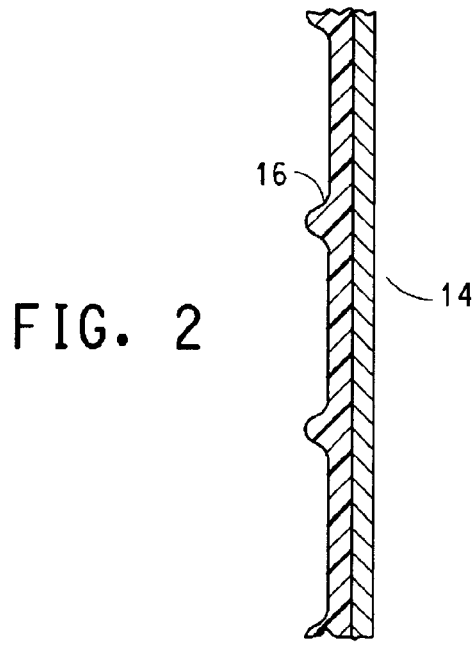
FIG. 2 is a cross-sectional view of the composite laminate of FIG. 1.

Reference will now be made in detail to the presently preferred embodiments of the invention, examples of which are illustrated below. A portion of a composite laminate useful in a preferred embodiment of the invention is shown in FIGS. 1 and 2. The composite laminate 12 comprises a membrane 14 and a grid layer 16. The membrane 14 is made of sheet material that is permeable to air and moisture vapor but is substantially impermeable to water. The grid layer 16 is comprised of a lightweight, textured material that can be bonded to the membrane 14. A substantial portion of the grid layer 16 is open so as to not unduly reduce the transmission of air and water vapor through the composite laminate 12.

According to the invention, the composite laminate is part of a composting system. According to a preferred embodiment of the invention, the composite laminate 12 is incorporated into the roof of a fixed composting enclosure 10, like the one shown in FIG. 3. The composting enclosure shown includes two side walls 21, back wall 20, and slanted roof 22. The enclosure also includes a door (not shown) opposite the back wall for adding or removing organic waste or compost to and from the structure. A composting pile 23 covers much of the floor of the composting enclosure. Air is generally supplied through the floor of the structure into the base of the compost pile.

The composite laminate 12 forms a slanted roof of the composting enclosure 10 using methods known in the art. For example, when the enclosure is large, the composite laminate might be installed over a support framework. With smaller enclosures, the composite laminate might hang freely from just a few supports. The composite laminate 12 is installed with the grid layer 16 facing the inside of the enclosure (i.e. facing the compost pile 23). In such systems, the roof of the composting enclosure is generally oriented at an angle α of between about 20 to 45 degrees relative to horizontal, preferably between about 20 to 40 degrees.

Figure 5:
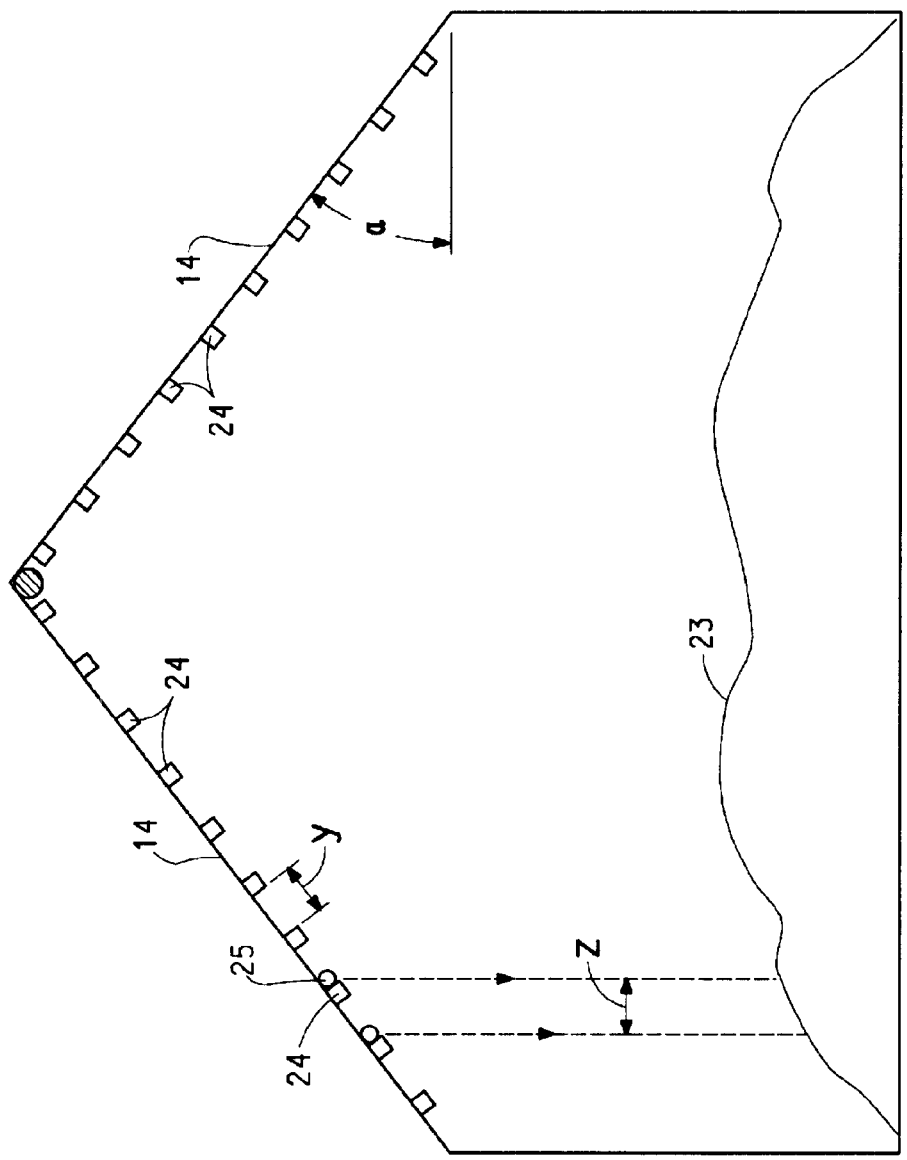
FIG. 5 is a cross-sectional view of the fixed composting enclosure of FIG. 3.

During the composting process, the temperature inside the composting enclosure is generally higher than the temperature in the outside environment such that a portion of the water vapor generated by the composting process condenses (dew point crossing) on the inside surface of the composite laminate 12 (i.e. the surface facing the inside of the enclosure). As water condenses on the surface of the membrane, it forms droplets that cling to the bottom surface of the composite laminate The water droplets travel downward, along the internal surface of the membrane, towards one of the side walls 21. Referring to FIG. 5, as a water droplet 25 travels along the membrane surface, it eventually contacts a horizontal grid element 24 of the grid layer 16, which causes the water droplet to detach from the membrane surface and fall downward onto the surface of the compost pile 23 below. The water droplets fall onto the surface of compost pile 23 in a relatively uniform manner, at spaced intervals determined by the spacing between horizontal grid elements 24 and the angle of inclination α of the roof of the enclosure. The grid layer thus provides management of condensate return to the composting material by re-distributing the condensate more evenly over the compost pile as opposed to concentrating the water return at the sides of the compost pile, which generally occurs when using conventional membranes. This avoids the creation of wet and dry zones in the compost, leading to the formation of better quality compost.

The membrane in the composite laminate of the composting system of the invention may comprise a single layer or a multi-layer material comprising two or more layers. According to the invention, the membrane prevents rainwater from entering the compost enclosure while still allowing air and water vapor to pass therethrough. If the composite laminate allowed rainwater to penetrate the enclosure, the compost pile would become too wet and it would not be possible to achieve sufficient oxygen distribution in the compost pile. On the other hand, the microorganisms which cause the decomposition of the organic waste in the compost pile generally require a relatively humid environment to function effectively. If the water vapor permeability of the composite laminate is too high, the compost pile could dry out resulting in an environment which is not favorable to efficient composting.

According to a preferred embodiment of the invention, the membrane 14 preferably exhibits a water barrier level, expressed as a hydrostatic head, of no less than about 50 cm, and more preferably greater than 1 meter, as measured according to ISO 811. The hydrostatic head is measured on the side of the membrane opposite the side to which the grid layer will be attached, as described above. Preferably, the composite laminate will have a water vapor permeability in the range of about 1000 to 3000 g/m$^2$ day, and more preferably in the range of about 1200 to 3000 g/m$^2$ day, and most preferably in the range of 1200 to 1700 g/m$^2$ day, measured at 23° C. according to ASTM E398-83. The air permeability of the composite laminate should be sufficient to permit removal of air introduced to the composting enclosure, as for example in a forced air system where air is supplied through the floor into the base of the compost pile. Preferably, the composite laminate has an air permeability, at a pressure differential of 10 millibars, of at least 10 liters/m$^2$ sec, and more preferably of at least 15 liters/m$^2$ sec, and most preferably in the range of about 15 to 20 liters/m$^2$ sec, as measured according to ISO 9237-1995.

In the composite laminate used in the invention, a portion of the surface of the membrane is blocked by the grid layer when the grid layer is attached to the membrane. The air and vapor permeability of the composite laminate is accordingly reduced from what would be the permeability of the membrane alone. The membrane should be selected to have an air and vapor permeability that is high enough such that, for a particular grid layer, the final composite laminate will have an air and vapor permeability in the desired range. Sheet materials suitable for use in the membrane include fibrous sheets and breathable waterproof porous films. A preferred membrane is a flash-spun polyolefin plexifilamentary sheet, such as Tyvek® flash-spun polyethylene (available from DuPont). Other fibrous sheets that can be used for the membrane include spunbond-meltblown-spunbond nonwovens (SMS) and similar materials which include spun-bonded and melt-blown layers such as SMMS, which includes two melt-blown layers sandwiched between two spun-bonded layers.

U.S. Pat. No. 3,227,784 to Blades et al. (assigned to E. I. du Pont de Nemours & Company ("DuPont")) describes a process wherein a polymer in solution is forwarded continuously to a spin orifice at a temperature above the boiling point of the solvent, and at autogenous pressure or greater, and is "flash-spun" into a zone of lower temperature and substantially lower pressure to generate a strand of plexifilamentary material. U.S. Pat. No. 3,227,794 to Anderson et al. (assigned to DuPont) teaches that plexifilamentary film-fibrils are best obtained from solution when fiber-forming polymer is dissolved in a solvent at a temperature and at a pressure above the pressure at which two liquid phases form, which pressure is generally known as the cloud point pressure at the given temperature. This solution is passed to a pressure let-down chamber, where the pressure decreases below the cloud point pressure for the solution thereby causing phase separation. The resulting two phase dispersion of a solvent-rich phase in a polymer-rich phase is discharged through a spinneret orifice to form the plexifilamentary strand.

Typically, the sheet of composite laminate is used on a composting enclosure for at least two years before being replaced. Accordingly, in some cases it may be desirable to include one or more strength layers in the membrane, thus providing a durable multi-layer membrane that is not readily punctured, torn, or abraded during use. This is especially important where the membrane will be used for an extended time without replacement. For example, porous films or flash-spun non-woven layers can be reinforced by attaching a woven or non-woven fabric, such as a non-woven reinforcing scrim material or a spun-bonded nonwoven, to one or both sides of the film or flash-spun layer. The various layers in a multi-layer membrane should be attached together in such a way that provides the desired air and moisture vapor permeability in the final composite laminate. This is generally done by dot or powder lamination, or by direct extrusion of a porous film on a carrier woven or non-woven substrate.

Commercially available materials that are suitable as the membrane layer in the current invention include Compogard® (available from W. L. Gore and Associates), which comprises an expanded polytetrafluoroethylene layer sandwiched between two woven polyester layers, and Daltex Roofshield (manufactured by Don & Low Nonwovens, U.K.), comprising thermally-assembled polypropylene spun-bonded non-woven layers with a breathable membrane in the middle. The 3-layer laminates described in German patent DE 4231414 to Ploucquet GmbH, which include a microporous layer such as a microporous polyurethane sandwiched between two woven or non-woven materials, are also suitable as the membrane layer in the current invention. A preferred membrane layer comprises Tyvek® flash-spun polyethylene (available from DuPont) which has been laminated to a reinforcing layer such as a woven fabric or a nonwoven reinforcing scrim. The membrane layer is preferably resistant to UV degradation and oxidation. Preferred polymers for use in the membrane layer include polyolefins such as polyethylene and polypropylene, or polyesters. The membranes may include additives such as UV stabilizers and thermal stabilizers or additives that inhibit growth of bacteria and/or fungi. When using a multi-layer membrane, it is generally sufficient for the outside layer (i.e. the side facing outside the compost enclosure) to be UV-stabilized. Alternately, each layer can be UV and thermally stabilized.

Figure 3:
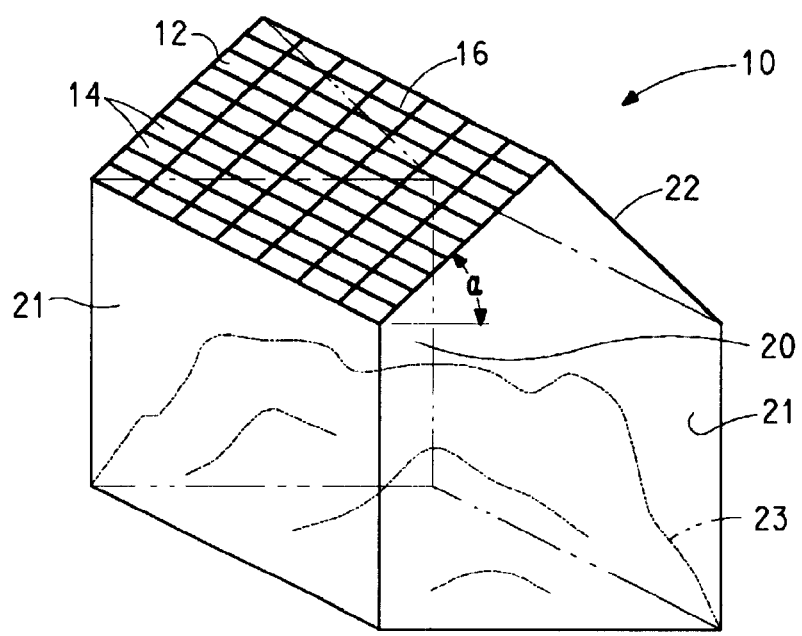
FIG. 3 is a schematic drawing of a fixed composting enclosure according to one preferred embodiment of the invention.
Figure 4:
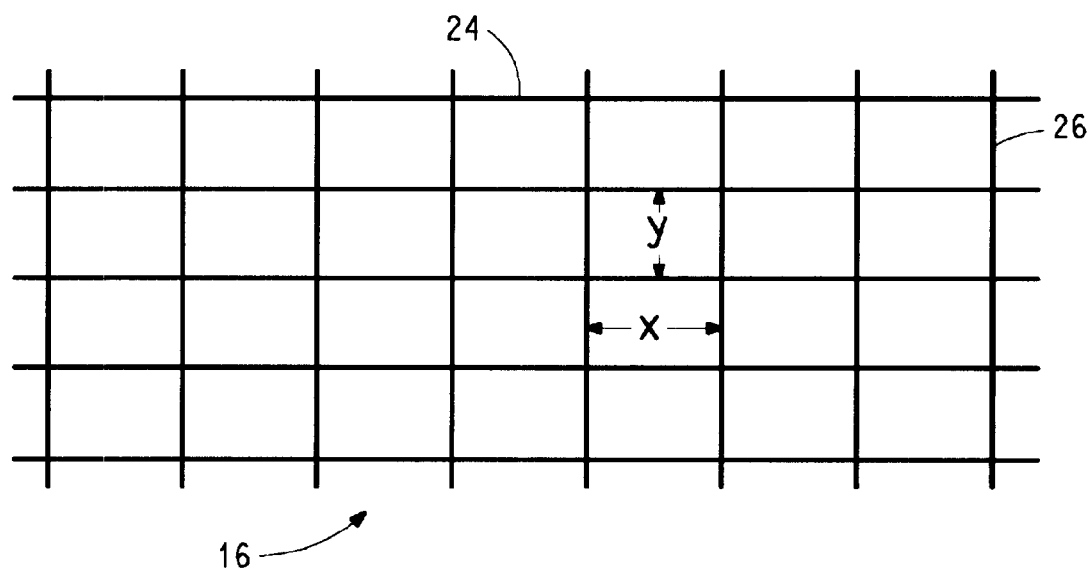
FIG. 4 is a plan view of a section of a rectangular grid layer that can be incorporated into composite laminate of the invention.

According to the invention, the composite laminate used in the composting system of the invention includes a grid layer. According to the preferred embodiment of the invention, the grid layer has a network of substantially equally spaced openings formed by interconnected geometrical forms (e.g. triangles, rhombuses, rectangles, or squares). The geometrical forms of the grid are preferably comprised of polymeric materials or metals, or combinations thereof, which have the property of releasing or repelling water (i.e. they do not retain water). In the current invention, it is preferred that the grid be comprised of a polymeric material and that the shape of the grid openings be as simple as possible so that the grid layer can be produced in an economical and continuous manufacturing process. Preferably the grid comprises a polyolefin and the grid openings are square or rectangular. The grid layer and the membrane may be attached to each other by methods known in the art, as for example by adhesive or thermal lamination. According to the preferred embodiment of the invention, a polyolefin grid layer is attached to the membrane by means of a flame lamination process. According to this process, the surface of the grid layer that is to be attached to the membrane is heated over an open flame to melt just the surface of the grid layer. The melted surface of the grid layer is immediately brought into contact with the membrane and calendered in a nip formed between a hard-surfaced roller and a soft-surfaced back-up roller, which nip applies enough pressure to allow the grid to bond to the membrane. FIGS. 3–5 show a preferred embodiment of the grid layer. A grid layer 16 is formed with rectangular openings. The horizontal spacing "x" of the grid (spacing between two vertical elements 26 of the grid) contributes to the strength of the final laminate and to achieving stable adhesion of the grid layer to the membrane. The horizontal spacing need only satisfy these criteria. Preferably the composite laminate has a tensile strength measured in both the x and y directions of at least 500 cm, more preferably at least 700 N/5 cm, measured according to ASTM D4595-86. The vertical spacing "y" of the grid (spacing between two horizontal grid elements 24) also helps determine the strength of the composite laminate and the degree of adhesion between the grid layer to the membrane. Importantly, the vertical spacing "y" of the grid, also serves a condensate management function. The vertical spacing "y" is preferably selected such that the longitudinal spacing "z" ($z = y \cos \alpha$) between the points where adjacent droplets contact the compost pile is no greater than about 10 cm, and more preferably no greater than about 5 cm. If the vertical spacing "y" in the grid layer is greater than about 50 cm, then alternating wet and dry zones are likely to form in the compost pile in the longitudinal direction "z". Preferably the vertical spacing "y" is no greater than about 20 cm, more preferably no greater than about 10. In general, a smaller vertical spacing "y" provides a more uniform condensate distribution in the compost pile. If the vertical spacing "y" is less than about 0.2 cm, then the grid layer starts to reduce the air permeability of the composite laminate to such an extent that very open membrane layers must be used in order to achieve the desired air permeability in the composite laminate. Such open membranes would be more likely to allow bacteria and other odorous molecules to pass therethrough, which is undesirable. Preferably the vertical spacing "y" is at least 0.2 cm, and more preferably at least 0.5 cm.

The height of the grid is chosen such that, at an angle $\alpha$ between 20 and 40 degrees with respect to the horizontal, a travelling water droplet will be released immediately once it contacts a horizontal element of the grid layer 16. Calculations can be made that involve liquid surface tension and characteristics of the grid and membrane materials to compute exactly the minimum grid height, for the purpose of engineering the grid dimensions. However, these heights can be readily determined experimentally. Generally grid heights in the range of 0.5 mm to 40 mm are acceptable in the current invention. Preferably, the grid height is in the range of 0.5 mm to 15 mm.

In the case of grid layers which are not square or rectangular or which are oriented diagonally on the roof, the principles described above apply. The shape of the grid openings will be mapped down onto the surface of the compost by the falling droplets. That is, the droplets will fall onto the surface of the compost so that a trace through the points of impact of the droplets on the surface of the compost maps the geometrical shape of the grid layer. The grid layer is selected such that the distance between the points where two adjacent droplets impact the compost heap is no greater than about 10 cm, and preferably no greater than 5 cm.

The following non-limiting example is intended to illustrate the invention and not to limit the invention in any manner.

EXAMPLE

A membrane layer was prepared by powder-laminating Tyvek® 1423 A, a flash-spun polyethylene non-woven that is UV and thermally stabilized (available from DuPont), to a reinforcing layer of UV and thermally-stabilized polypropylene woven tape (obtained from Bonar Phormium, Belgium). The woven tape had a tensile strength of 775 N/5 cm in the warp direction and 1600 N/5 cm in the weft direction. A grid layer comprised of high-density polyethylene (Product code 3035A, obtained from Nortene Technologies, Lille, France) was flame-laminated to the side of the Tyvek® flash-spun layer opposite that to which the woven tape fabric had been laminated. The grid layer comprised 0.8 cm×0.8 cm square openings (i.e. the horizontal and vertical spacing were both 0.8 cm, measured from the edges of the vertical and horizontal grid elements, respectively) and had a grid height of 1.5 mm. It was found that the air permeability of the Tyvek®-woven tape laminate was reduced by about 40% after laminating the grid layer to the membrane, to provide an air permeability in the final laminate of 15.4 liters/m$^2$ sec, measured according to ISO9237-1995 at 10 millibars. The vapor permeability of the composite laminate was 1250 liters/m$^2$ day and the hydrostatic head was 120 cm.

When this composite laminate is used as a membrane on a composting enclosure such as that shown in FIG. 3, the water droplets will fall from the inside surface of the laminate (grid side) and return to the compost heap at a spacing of 0.8 $\alpha$ cm where $\alpha$ is the angle of inclination of the roof with respect to horizontal (generally between 20 and 40 degrees).

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

What is claimed is:

1. A composting system comprising:
    an enclosure for containing organic matter undergoing composting, wherein said enclosure has an access through which organic waste can be introduced into the enclosure and through which composted matter can be removed from the enclosure, and
    said enclosure has a sloped roof comprised of a composite laminate, said composite laminate includes an air and moisture permeable membrane having an inside surface that faces into said enclosure, and said inside surface of said membrane is adhered to an open grid layer.

2. The composting system of claim 1 further comprising means for introducing fresh air into organic matter being composted within said enclosure.

3. The composting system of claim 1 wherein said membrane consists essentially of synthetic polymer material.

4. The composting system of claim 3 wherein said membrane consists essentially of a sheet materials selected from the group of fibrous nonwovens, waterproof porous films, and combinations thereof.

5. The composite sheet of claim 4 wherein said membrane is a fibrous nonwoven polyolefin sheet.

6. The composting system of claim 5 wherein said membrane includes a layer of a flash-spun bonded plexifilamentary polyolefin material.

7. The composting system of claim 1 wherein said grid layer is comprised of synthetic polymer.

8. The composting system of claim 7 wherein said gird layer consists essentially of polyolefin polymer.

9. The composting system of claim 7 wherein said grid layer is at least 50% open.

10. The composting system of claim 1 wherein the grid layer forms a repeating pattern of a quadrilateral geometric shape, which pattern is defined by walls between the repeating shape.

11. The composting system of claim 10 wherein the quadrilateral shape of said repeating pattern is a rectangle.

12. The composting system of claim 11 wherein the walls that define the repeating rectangles of the grid layer have a height in the range of 0.5 mm to 40.

13. The composting system of claim 12 wherein the walls that define the repeating rectangles of the grid layer have a height in the range of 0.5 mm to 15 mm.

14. The composting system of claim 1 wherein the roof of said enclosure is sloped at an angle of between 20 and 45 degrees.

* * * * *